United States Patent
Cherchali et al.

(10) Patent No.: US 7,590,058 B1
(45) Date of Patent: Sep. 15, 2009

(54) METHOD AND APPARATUS FOR CONTROLLING THE QUALITY OF SERVICE OF VOICE AND DATA SERVICES OVER VARIABLE BANDWIDTH ACCESS NETWORKS

(75) Inventors: Ali M. Cherchali, Jackson, NJ (US); Gagan Lal Choudhury, Marlboro, NJ (US); Marius Jonas Gudelis, Holmdel, NJ (US); Robert J. McLaughlin, Allentown, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 439 days.

(21) Appl. No.: 11/000,677

(22) Filed: Dec. 1, 2004

Related U.S. Application Data

(60) Provisional application No. 60/528,044, filed on Dec. 9, 2003.

(51) Int. Cl.
*G01R 31/08* (2006.01)
(52) U.S. Cl. ............ 370/230; 370/413; 370/395.4
(58) Field of Classification Search .......... None
See application file for complete search history.

(56) References Cited

U.S. PATENT DOCUMENTS

| | | | | |
|---|---|---|---|---|
| 5,541,922 A | * | 7/1996 | Pyhalammi | 370/462 |
| 6,400,723 B1 | * | 6/2002 | Burg et al. | 370/412 |
| 6,401,147 B1 | * | 6/2002 | Sang et al. | 710/56 |
| 6,577,596 B1 | | 6/2003 | Olsson et al. | |
| 6,721,325 B1 | | 4/2004 | Duckering et al. | |
| H2103 H | * | 5/2004 | Modiano | 370/230 |
| 6,970,424 B2 | * | 11/2005 | Fawaz et al. | 370/232 |
| 7,154,854 B1 | * | 12/2006 | Zweig et al. | 370/236 |
| 2002/0178282 A1 | | 11/2002 | Mysore et al. | |
| 2003/0107991 A1 | | 6/2003 | Tezuka et al. | |
| 2003/0202507 A1 | | 10/2003 | Nishida et al. | |
| 2004/0073690 A1 | | 4/2004 | Hepworth et al. | |
| 2004/0081197 A1 | | 4/2004 | Liu | |
| 2004/0233845 A1 | * | 11/2004 | Jeong et al. | 370/230 |

OTHER PUBLICATIONS

U.S. Appl. No. 10/873,579, "Establishing Traffic Priorities in a Voice Over IP Network", filed Jun. 22, 2004.

* cited by examiner

*Primary Examiner*—Michael J Moore, Jr.

(57) ABSTRACT

A terminal adapter for guaranteeing the quality of service of both voice and data packets is disclosed. When a data packet is received in a first data input queue of a terminal adapter, a determination is made whether a voice packet is present in a voice input queue. Another determination is made as to whether the sum of the size of the data packet and the size of all packets in a terminal adapter output queue would exceed a first size threshold established for the output queue. If voice packets are present in the voice input queue, or if the aforementioned sum exceeds the size threshold, the data packet is not forwarded to the output queue. If no voice packets are present in the voice input queue and if the aforementioned sum is below the first size threshold, then the data packet is forwarded to the output queue.

23 Claims, 7 Drawing Sheets

METHOD AND APPARATUS FOR CONTROLLING THE QUALITY OF SERVICE OF VOICE AND DATA SERVICES OVER VARIABLE BANDWIDTH ACCESS NETWORKS

CROSS REFERENCE TO RELATED APPLICATIONS

This application claims the benefit of U.S. Provisional Application No. 60/528,044, filed Dec. 9, 2003, which is incorporated herein by reference.

BACKGROUND OF THE INVENTION

This invention relates generally to Internet communications, and more particularly to Quality of Service techniques for transmitting packets from different communication sources across a packet switched network. Successful transmission of both synchronous content (e.g., voice) and asynchronous content (e.g., data) requires careful scheduling, particularly if the packet load from the asynchronous source can meet or exceed the network capacity. This creates the possibility of filling most of the network channel bandwidth with data packets, thereby undesirably delaying transmission of real-time voice conversation packets, causing delay jitters or even the loss of voice packets. If such delay jitters or losses of voice packets are not prevented, then the quality of voice content received at a destination may be severely degraded and may even cause the listener to drop the voice call. For example, when one or more users initiate data traffic during a Voice over IP call, the data will interfere with the voice packets causing poor voice quality at the listening destination. This problem is often a result of limited bandwidth in network access links such as cable and DSL that have slow upstream feed rates. While one solution to this problem is to restrict data packet throughput, excessive restrictions then may cause severe throughput loss to data transmissions, which is also not desirable.

Therefore, a solution is needed for a Voice over IP communication system that provides efficient use of network transmission links for both data and voice traffic, while at the same time establishing predictable Quality of Service for both data and voice transmissions. Prior attempts typically involved simply giving a higher priority to voice packets and/or slowing down data packet rates by inserting a gap between successive data packets.

SUMMARY OF THE INVENTION

The present inventors have invented a terminal adapter and an associated method for guaranteeing the quality of service of both voice and data packets. Specifically, the quality of service of voice and data calls processed by a terminal adapter in a data network is ensured by giving priority to voice calls but, at the same time, ensuring data will still be transmitted when the terminal adapter is not processing voice packets associated with a voice call and the backlog of packets at an output queue is not too large.

In accordance with one illustrative embodiment, when a terminal adapter receives a data packet in a first data input queue, the adapter will determine whether a voice packet is present in a voice input queue. If a voice packet is present in the voice input queue, the terminal adapter forwards the voice packet to the output queue. If a voice packet is not present in the voice input queue, the terminal adapter forwards the data packet to the output queue only if the sum of the size of the data packet and the cumulative size of any packets in the output queue does not exceed a size threshold established for said output queue. In another illustrative embodiment, if the data packet exceeds the size threshold, it is held in a terminal adapter input queue for a predetermined amount of time. The quality of service of voice and data calls is ensured by giving priority to voice calls but, at the same time, ensuring data will still be transmitted when there are no voice packets in the voice input queue and the backlog of packets at a monitored output queue is not too high. In yet another illustrative embodiment, data packets equal to or below a certain size threshold are kept in one data input queue and data packets above the size threshold are kept in a second data input queue and the first data input queue is given priority over the second one in terms of transmission of packets to the output queue.

These and other advantages of the invention will be apparent to those of ordinary skill in the art by reference to the following detailed description and the accompanying drawings.

DETAILED DESCRIPTION

Figure 1:
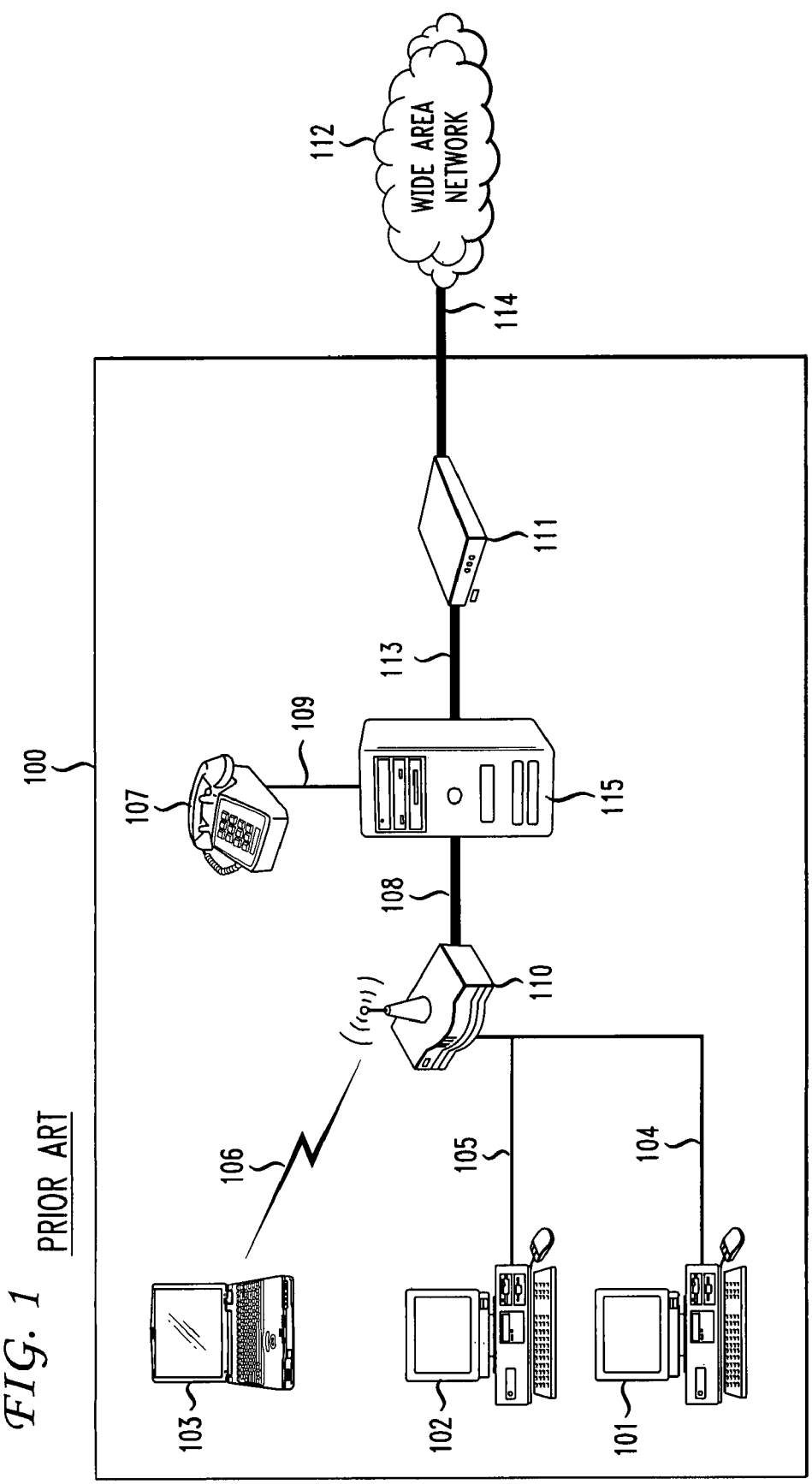
FIG. 1 shows a prior art network for transmitting both data and voice packets.

FIG. 1 shows a portion of an illustrative prior art packet network capable of carrying both voice and data traffic. Referring to that figure, access network 100 has a plurality of different types of terminals, such as computers 101, 102, and 103, and telephone 107. The data terminals are connected to a router 110 via, illustratively, links 104, 105, and 106, which may be wired links (i.e., links 104 and 105) or wireless links (i.e., link 106). There is a terminal adapter (TA) device 115 that connects to the data device router 110 over link 108 as well as the voice device telephone 107 over link 109. The TA 115 is connected to a DSL or cable modem device 111 over the link 113. The modem is connected to a Wide Area Network (WAN) 112 over a DSL or cable link 114. The TA 115 multiplexes voice and data traffic from the telephone 107 and the router 110 and forwards them towards the cable modem 111 for transmission over the WAN 112. Conversely, the TA 115 receives voice and data traffic from the WAN 112 through the modem 111, demultiplexes it, and forwards data traffic to Router 110 and voice traffic to telephone 107. In addition, the TA 115 also performs analog-to-digital (AD) and digital-toanalog (DA) conversion for voice traffic. Furthermore, the TA 115 also provides a buffer for voice packets in the WAN-to-telephones direction so that variable jitter experienced by voice packets over the WAN can be smoothed out before the DA conversion. One skilled in the art will recognize that several variations to the configurations shown in FIG. 1 are possible. As an example, the TA function may be integrated with the cable modem 111 or the router 110. As another example, there may not be any router 110 and the computers 101, 102 and 103 may be connected directly to TA 115. As yet another example, there may be multiple telephones connecting to the TA 115 instead of just one shown in FIG. 1.

Access network 100 is, illustratively, capable of transmitting both data and voice traffic simultaneously over the same access infrastructure (e.g., cable, DSL, etc) while maintaining a desired Quality of Service (QoS) for each type of traffic. As one skilled in the art will understand, voice traffic is more sensitive to excessive delays, delay jitters and losses in transmissions than is data traffic because such delays and losses may result in garbled, unintelligible voice received by the listener who in turn may, for example, hang up if the received voice quality is sufficiently poor. However, while data traffic is less sensitive to such delays, excessive delays and losses to data traffic are also undesirable since that may undesirably reduce data upload and download rates experienced by the end user. Therefore, a mechanism for prioritizing voice traffic is needed to ensure that the voice message quality remains high while, at the same time, delays experienced by data traffic remain low.

Figure 2:
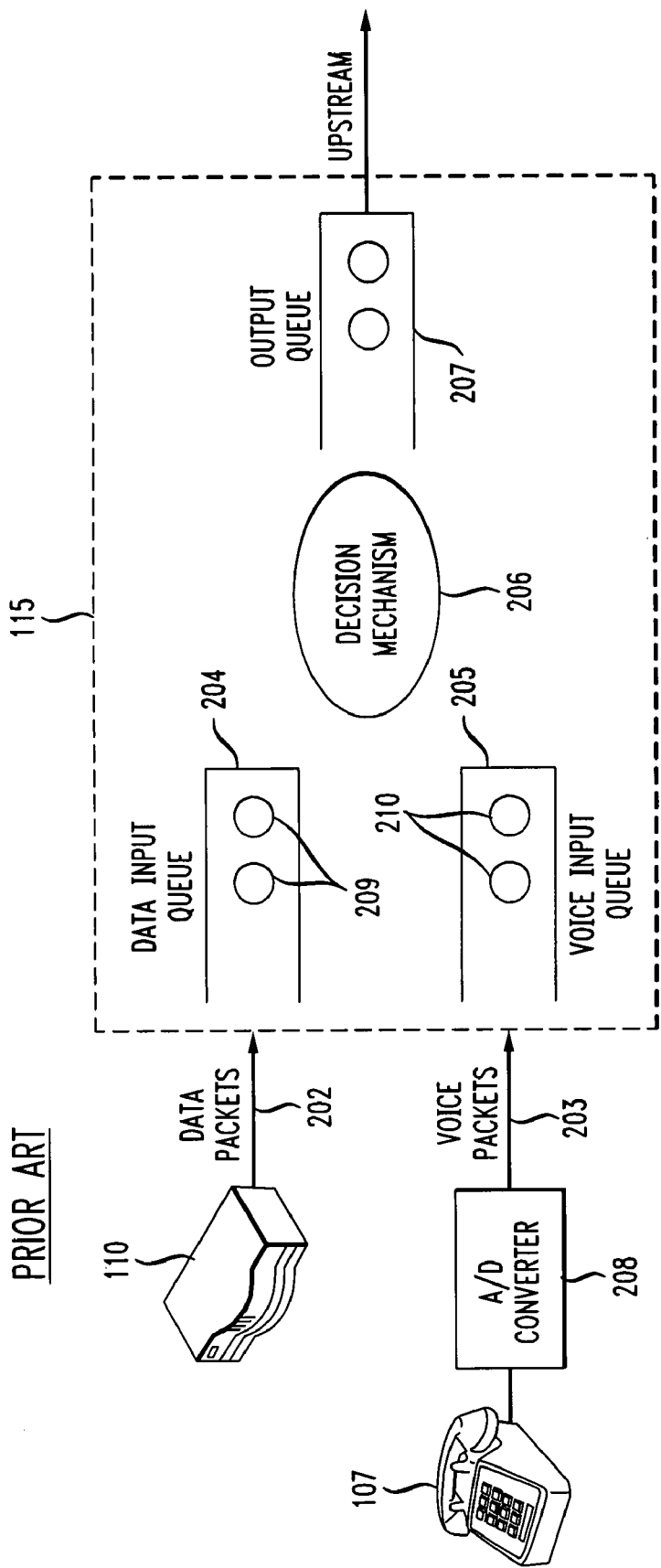
FIG. 2 shows a schematic diagram of a prior art terminal adapter used in the network of FIG. 1 for controlling the Quality of Service associated with the transmission of both voice and data packets.

FIG. 2 shows an illustrative prior art embodiment of terminal adapter 115 of FIG. 1 that is useful in ensuring the desired QoS is maintained for both voice and data packets. Referring to FIG. 2, terminal adapter 115 receives data packets 209 from router 110 transmitted along path 202 and stores them in the data input queue 204. Terminal adapter 115 also receives voice packets 210 from telephone 107 following A/D conversion by A/D converter 208 transmitted along path 203 and stores them in the voice input queue 205. One skilled in the art will recognize that there may be many data sources and voice sources although, illustratively, only one of each is shown in FIG. 2. In the case where multiple data and voice sources are used, data packets from all such data sources will be stored in data input queue 204 and voice packets from all such voice sources will be stored in voice input queue 205. Decision mechanism 206 then uses decision criteria, discussed below, to select packets from the data input queue 204 and the voice input queue 205 and forward those packets to output queue 207. Packets are then released from the output queue 207 and forwarded upstream through illustrative modem 111 in FIG. 1 to an intended destination, illustratively in WAN 112 of FIG. 1. Illustratively, the occupancy of the output queue 207 is monitored and used to make decisions as to when a data packet should be forwarded from the input queue 204 to the output queue 207, depending upon the occupancy level of output queue 207. It is also to be noted that it is possible for the decision mechanism 206 to make its decision based not just on the output queue 207 of TA 115 but also the output queue 207 of some device further upstream, such as modem 111. One skilled in the art will recognize monitoring the output queue of modem 111 could be easily implemented if the TA function and modem function are integrated in the same device, however such monitoring could still be implemented with separate devices as long as appropriate communications to monitor the output queue of modem 111 existed between the TA 115 and modem 111.

One skilled in the art will recognize that decision mechanism 206 may be, illustratively, implemented using a programmable computer having a processor, memory and storage media adapted to run a program to perform a wide variety of functions, including making the various determinations discussed herein. Such a decision mechanism may be implemented using either a stand-alone computer or such functionality may be integrated with any network device suitable for making such determinations.

The present inventors have invented a method whereby the criteria used by the decision mechanism 206 in FIG. 2 are selected to manage the delay experienced by the voice and data packets in input queues 205 and 204, respectively, while maintaining QoS goals for both types of traffic. In particular, data packets are only sent to output queue 207 if certain decision criteria related to the output queue are met. Different criteria are used by the decision mechanism 206 depending upon whether voice packets are present in the voice input queue 205. In accordance with the principles of the present invention, four different variables are illustratively assigned values to determine whether data packets are sent to the output queue 207. These criteria are 1) the allowed maximum value of the sum of the size of packets in the output queue 207 when no voice calls are present ($Q_{NV}$); 2) the allowed maximum value of the sum of the size of packets in the output queue 207 when voice calls are present ($Q_V$); 3) the maximum size of a single data packet with no voice calls ($P_{NV}$); and 4) the maximum size of a single data packet with voice calls ($P_V$). Typically, these four variables may be expressed in bytes with $P_{NV}$ being smaller in value than $Q_{NV}$ and $P_V$ being smaller in value than $Q_V$.

In the case where no voice calls are being made, only data packets are received by the terminal adapter 115. These data packets are stored in data input queue 204. The decision mechanism 206 will then use $Q_{NV}$ and $P_{NV}$ to determine the maximum number of bytes to allow into output queue 207 and the maximum allowed size of a single data packet, respectively. Illustratively, the values of $Q_{NV}$ and $P_{NV}$ are chosen to allow a typical maximum sized data packet to move unconstrained to the output queue 207. Illustratively, $Q_{NV}$=2 Kbytes and $P_{NV}$=1.6 Kbytes. Such a setting will allow, for example, a maximum sized packet of 1.5 Kbytes as well as several smaller system message packets (e.g., Acknowledgement, or ACK, packets) to move freely to the output queue. In one illustrative example, if a particular packet is larger than 1.6 Kbytes, and would therefore not be allowed in the system, that packet may be fragmented (i.e., separated into two or more smaller packets) by the terminal adapter in order to allow them in the system. Alternatively, one skilled in the art will recognize that the maximum allowable packet size could be established when a communication session is initiated and, therefore, no packets larger than the maximum allowable size would be received by the terminal adapter. Of course, in this scenario, no packet fragmentation would be necessary.

Figure 3:
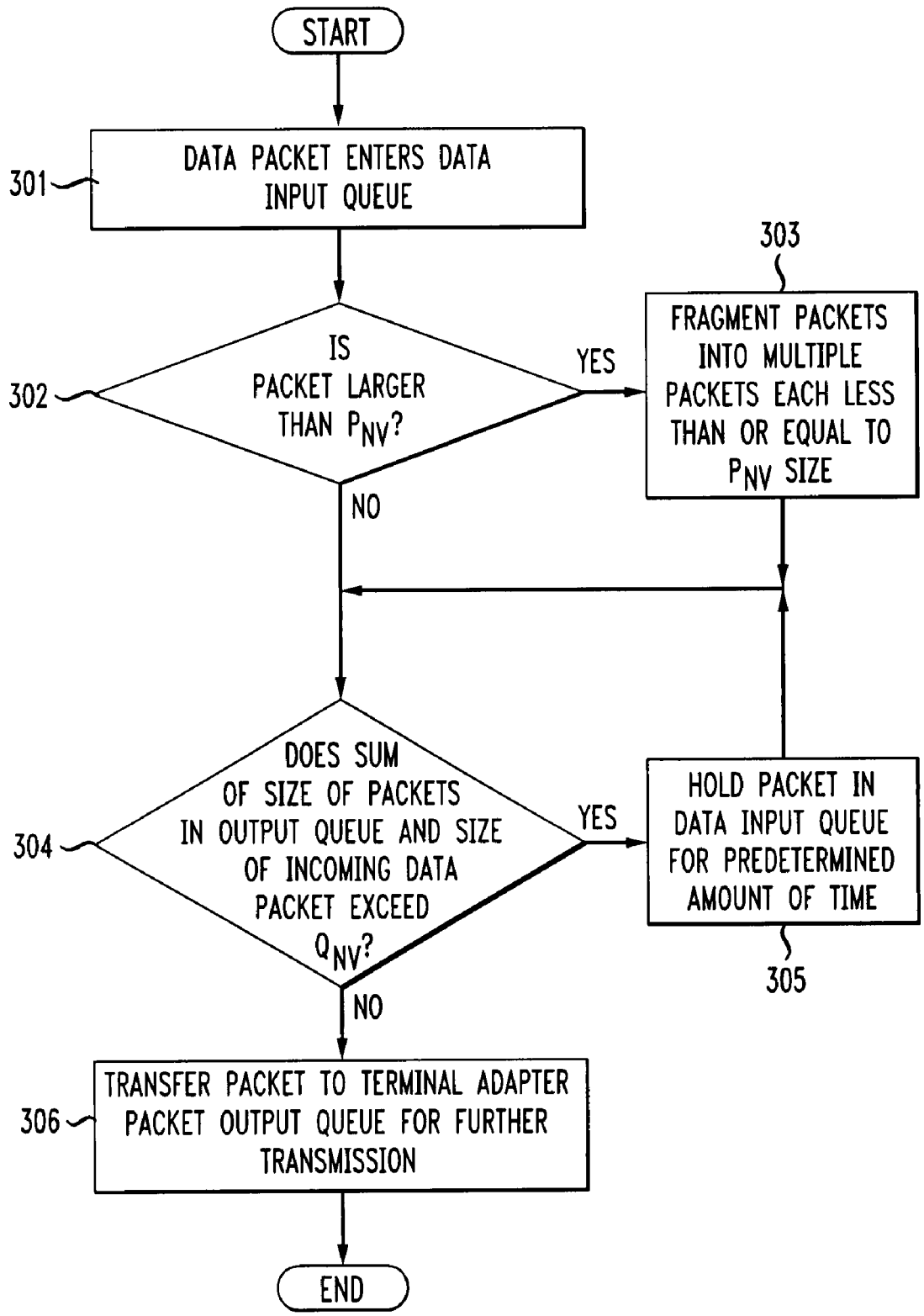
FIG. 3 shows a flow chart of the steps performed in accordance with one embodiment of a method for use in the terminal adapter of FIG. 2 in accordance with the principles of the present invention.

FIG. 3 shows the steps of an illustrative method for processing data packets for transmission to the output queue in the absence of voice calls. At step 301, a data packet enters the data input queue of a terminal adapter, such as terminal adapter 115 of FIG. 2. At step 302, the decision mechanism of the terminal adapter determines whether the incoming data packet is larger than $P_{NV}$. If the packet is larger than the value of $P_{NV}$, then the data packet is fragmented into multiple smaller packets at step 303, each of which is smaller than or equal to $P_{NV}$. Then, before allowing a packet to enter the output queue for further transmission, the decision mechanism determines, at step 304, whether the sum of the current size of the packets in the output queue plus the size of the incoming data packet exceeds the value of $Q_{NV}$. If this sum exceeds the value of $Q_{NV}$, then the decision mechanism at step 305 holds the data packet in the data packet input queue for a predetermined amount of time (e.g., 1 ms) and, once again at step 304, makes the determination as to whether the sum of the output queue and the size of the data packet still exceeds the value of $Q_{NV}$. Once the sum falls below the value of $Q_{NV}$, at step 306, the data packet is transferred to the terminal adapter output queue for further transmission.

Figure 4:
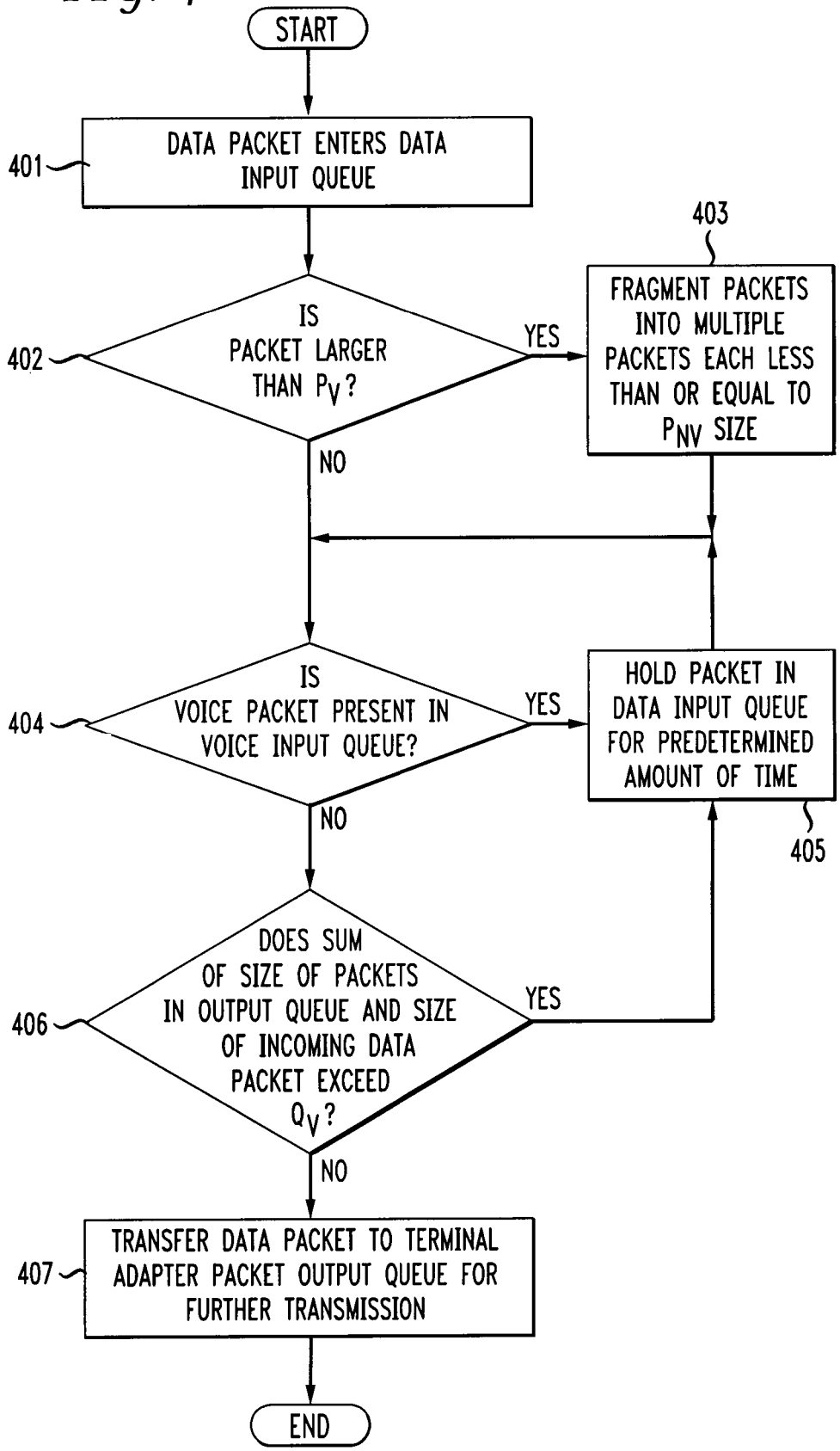
FIG. 4 shows a flow chart of the steps performed in accordance with a second embodiment of a method for use in the terminal adapter of FIG. 2 in accordance with the principles of the present invention.

In the case where voice calls are present along with data messages, the decision mechanism illustratively uses a similar, but slightly different, methodology. First, any voice packets arriving at the voice input queue are immediately forwarded to the output queue without any restrictions. Second, a determination is required as to whether a data packet arriving at the data input queue should be transmitted to the output queue. Specifically, this determination is made using the variables $Q_V$ and $P_V$ instead of variables $Q_{NV}$ and $P_{NV}$. Illustratively, while $Q_{NV}$ and $P_{NV}$ were set at 2 Kbytes and 1.6 Kbytes, respectively, $Q_V$ and $P_V$ may be set at a lower size such as, for example 400 bytes and 300 bytes, respectively. FIG. 4 shows the steps of an illustrative method whereby both voice calls and data packets are received by the terminal adapter 115 in FIG. 2. First, at step 401, a data packet 209 is received at data input queue 204 in FIG. 2. At step 402, a determination is made whether the data packet exceeds the established value of $P_V$ (e.g., 300 bytes). If the packet exceeds this size then, at step 403, the packet is fragmented into separate, smaller packets each having a size less than $P_V$. Then, once the packet has been fragmented, or if the packet is already smaller than the value of $P_V$, as determined at step 402, then a determination is made at step 404 whether a voice packet 210 is present in the voice input queue 205 in FIG. 2. If yes, then the decision mechanism 206 at step 405 holds the data packet in data input queue 204 for a predetermined amount of time (e.g., 1 ms) and then checks again at step 404 whether a voice packet is present in the voice input queue. If there is no voice packet present, then a determination is made at step 406 whether the sum of the current size of the packets in the output queue plus the size of the incoming data packet exceeds the value of $Q_V$. If yes, then at step 405 the decision mechanism waits a predetermined amount of time (e.g., once again, 1 ms) and then returns to perform the determination at step 404. Once the determination is made at step 404 that no voice packet is present and the determination is made at step 406 that the sum of the current size of the packets in the output queue plus the size of the incoming data packet is below the value of $Q_V$, the data packet is sent at step 407 to the terminal adapter output queue 207 of FIG. 2 for further transmission.

Thus, when no voice calls are present, the decision mechanism performs the steps of FIG. 3 using $P_{NV}$ and $Q_{NV}$ to govern the transmission of data packets to the output queue. Then, when a voice calls arrives, the decision mechanism uses the values of $P_V$ and $Q_V$ in the steps of FIG. 4 to govern the transmission of data packets to the output queue. In either case, data packets are constrained in two different ways. First, each individual data packet is constrained to the maximum allowed size $P_{NV}$ in the absence of voice calls and $P_V$ in the presence of voice calls. Second, the sum of the sizes of packets currently present in the output queue plus the size of the next data packet to be admitted is constrained by $Q_{NV}$ in the absence of voice calls and by $Q_V$ in the presence of voice calls. This second constraint is largely governed by the rate at which the output queue is drained. If the output queue is drained slowly then the next data packet in the input queue will have to wait a while before admission. However, if the output queue is drained at a fast rate then the next data packet in the input queue will be admitted fairly quickly. One skilled in the art will recognize once again that, instead of making the admission decision on the occupancy of just the TA 115 output queue, one can make the admission decision on the occupancy of both the TA 115 and modem 111 output queues. In that case in step 304 of FIG. 3 and in step 406 of FIG. 4, the parameters QNV and QV would be applied to the sum of the sizes of packets in the TA 115 output queue and the modem 111 output queue.

While, as discussed above, data packets are constrained even in the absence of voice calls, as shown in FIG. 3, one skilled in the art will recognize that, depending upon the desired implementation, it is possible to entirely remove these constraints by setting both $P_{NV}$ and $Q_{NV}$ to very large values thereby allowing a packet to be of arbitrarily large size and allowing an arbitrarily large number of data packets to enter the output queue. However this could lead to the case where the output queue has too many bytes as the initial voice packets in a call arrive and, as a result, these voice packets may experience unacceptably large delays. Thus, the variables $P_{NV}$ and $Q_{NV}$ are set at a level necessary to avoid this situation.

As one skilled in the art will recognize, a user's perception of quality of data service in the downstream direction is largely governed by the system response time to relatively small packets in the upstream direction, where downstream direction is defined as the direction from WAN 112 to router 110 and the upstream direction is defined as the direction from router 110 to WAN 112 in FIG. 1. For example, in many implementations, the data throughput in the downstream direction is a function of the latency experienced by upstream acknowledgement packets, which are typically small in size since each such acknowledgement packet allows another window of packets to be transmitted in the downstream direction. Of course downstream bandwidth would also be a constraining factor, but in many access networks, particularly ones using cable as a transmission medium, the downstream bandwidth is very high and so the main constraint comes from the latency of upstream acknowledgement packets. Therefore, in addition to using the variables $P_{NV}$ and $Q_{NV}$ to govern the treatment of data packets when no voice calls are present and $P_V$ and $Q_V$ to govern the treatment of those packets when voice calls are received, it may be advantageous to also treat the data packets differently according to the size of the respective packet.

Figure 5:
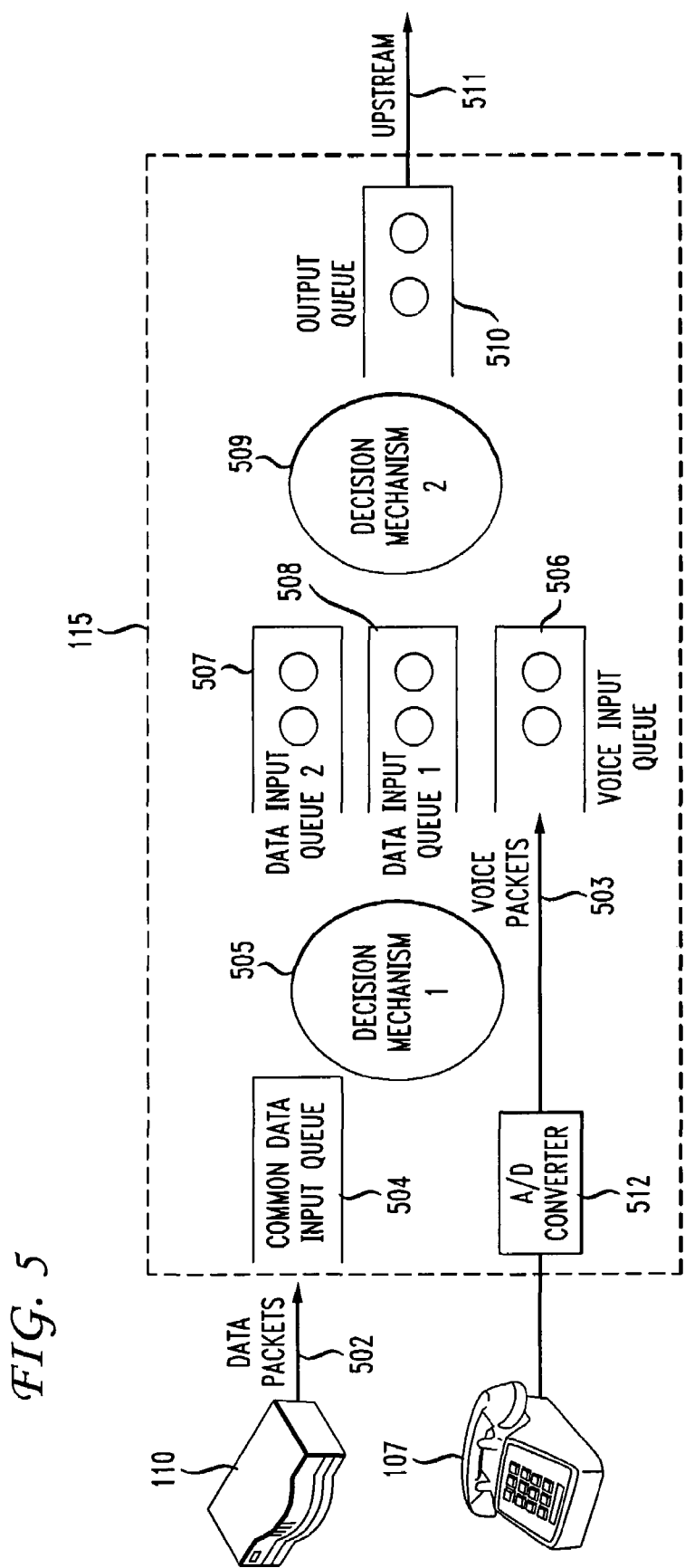
FIG. 5 shows a schematic diagram of a terminal adapter in accordance with the principles of the present invention.

FIG. 5 shows another illustrative embodiment of a terminal adapter in accordance with the principles of the present invention, whereby the difference in size of data packets is used to enhance the quality of service as perceived by the user of the network. Specifically, referring to that figure, terminal adapter 115 once again receives data packets from router 110 and voice packets from telephone 107 following A/D conversion by A/D converter 512. Data packets are then transmitted along path 502 to common data input queue 504 and voice packets are transmitted along path 503 to voice input queue 506. A first decision mechanism 505 uses data decision criteria to select packets from the common data input queue and forward them to one of a plurality of data input queues, such as data input queue 1 508 and data input queue 2 507. Illustratively, the selection of which data packets are forwarded to a particular queue is based upon the size of the respective data packets so that, for example, smaller data packets are forwarded to data input queue 1 508 and larger data packets are forwarded to data input queue 2 507. A second decision mechanism then uses decision criteria, also discussed below, to select which packets from the plurality of data input queues and the voice input queue to transfer to the terminal adapter output queue 510. Packets are then released from the output queue 510 and forwarded upstream along path 511 through illustrative modem 111 in FIG. 1 to an intended destination, illustratively in WAN 112 of FIG. 1.

As before, the four variables $P_{NV}$, $Q_{NV}$, $P_V$ and $Q_V$ are used by decision mechanism 2 509 to select which packets are forwarded from the input queues to the terminal adapter output queue. However, instead of a single data input queue 204 in FIG. 2, the illustrative terminal adapter 115 of FIG. 5 has two data input queues 507 and 508, respectively. A first decision mechanism, shown in FIG. 5 as decision mechanism 1 505 is used to separate the incoming data packets according to a packet size threshold, PT. Illustratively, $P_T$ is set at a value of 50 bytes such that all data packets above 50 bytes in size are sent to data input queue 2 507 and data packets equal to or under 50 bytes in size are sent to data input queue 1 508. One skilled in the art will recognize that more than two data input queues may be used in accordance with the principles of the present invention. The operation of decision mechanism 2 509 once again depends on whether or not a voice call is present.

Figure 6:
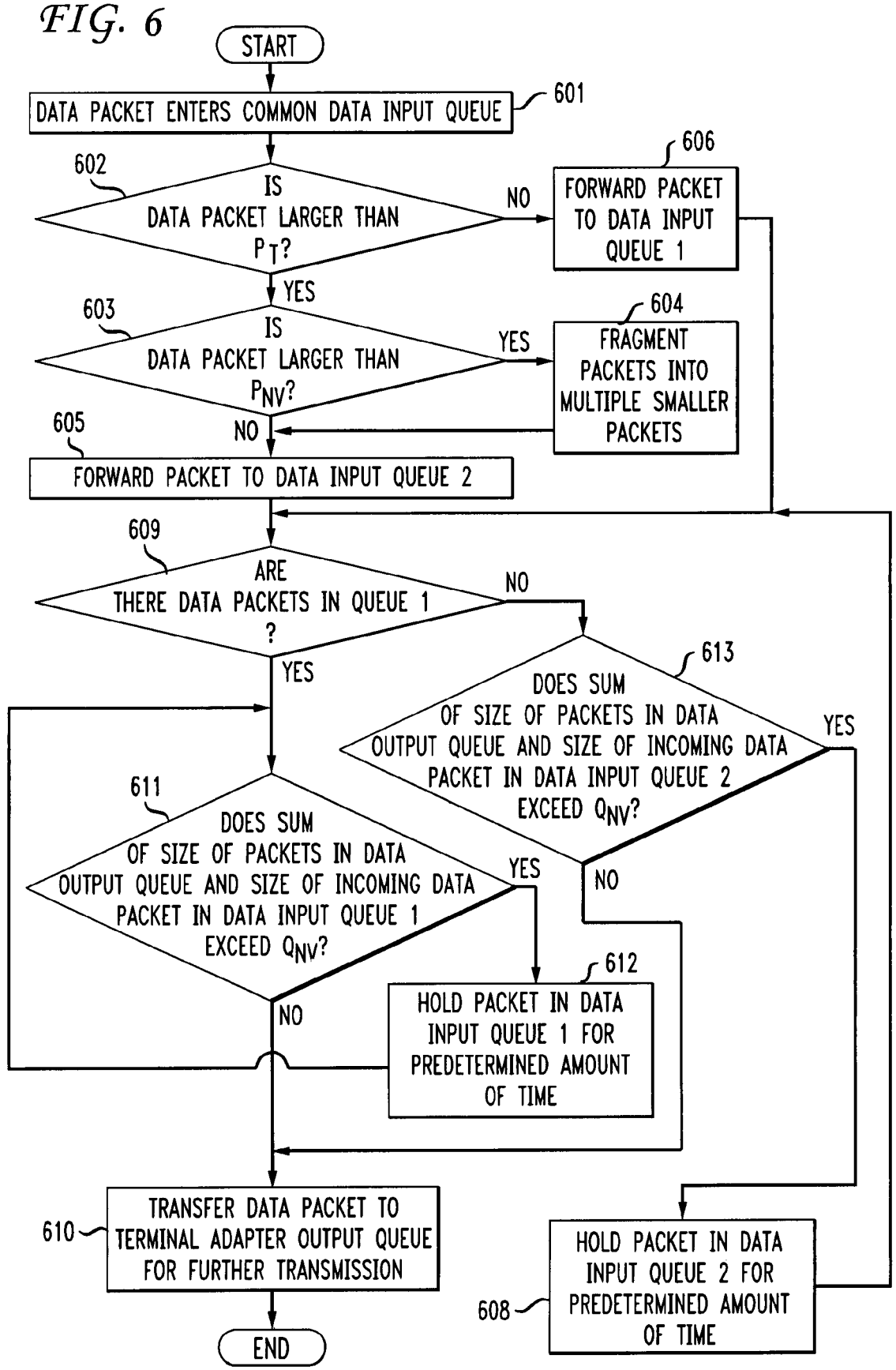
FIG. 6 shows one embodiment of a method for use in the terminal adapter of FIG. 5 in accordance with the principles of the present invention.

FIG. 6 shows the steps of an illustrative method useful with the decision mechanisms of FIG. 5 for processing data packets for transmission to the output queue in the absence of voice calls. At step 601, a data packet enters the common data input queue 504 of a terminal adapter, such as terminal adapter 115 of FIG. 5. At step 602, a determination is made by decision mechanism 1 505 as to whether the data packet is larger than the value assigned as the threshold $P_T$. If the packet is larger than this value, and if the packet is also larger than the set value for the maximum packet size $P_{NV}$ (illustratively 1.5 Kbytes), as determined at step 603, then at step 604 the data packet is fragmented so it is less than or equal to the $P_{NV}$ size. At step 605, the fragmented packet(s) (or the original incoming packet itself if smaller than or equal to the threshold $P_{NV}$) is sent to data input queue 2 507. If, on the other hand, the determination of step 602 is that the incoming data packet is smaller than or equal to the size $P_T$, at step 606 the packet is forwarded to data input queue 1 508. Next, a determination is made at step 609 as to whether there are any data packets in data input queue 1. If there are no packets in data input queue 1 508, then at step 613, a determination is made by decision mechanism 2 509 as to whether the sum of the size of the packets in output queue 510 and the size of the packet in data input queue 2 507 exceeds the value of $Q_{NV}$. If the sum is lower than or equal to $Q_{NV}$, then at step 610 the packet in data queue 2 507 is forwarded to output queue 510. If, however, the determination of step 613 is that the sum is higher than $Q_{NV}$, the packet is held in data input queue 2 507 for a period of time (e.g., 1 ms) before returning to make the determination of step 609 again.

If the determination of step 609 is that there are data packets in data input queue 1 508, then a determination is made at step 611 as to whether the sum of the size of the packets in output queue 510 and the size of the packet in data input queue 1 exceeds the value of $Q_{NV}$. If this sum does exceed $Q_{NV}$, at step 612 the packet is held in data input queue 1 for a predetermined amount of time (once again, illustratively 1 ms). The packet will thus remain in data input queue 1 until the sum of the sizes does not exceed $Q_{NV}$. Then, at step 610, the data packet will be forwarded to output queue 510 for further transmission.

Thus, in the absence of voice calls, larger data packets will be held in data input queue 2 until the smaller data packets in data input queue 1 have been forwarded and, also, the determination is made that the size $Q_{NV}$ will not be exceeded by forwarding that packet to the output queue. Data packets in data input queue 1 will be immediately forwarded to the output queue as long as threshold $Q_{NV}$ is not exceeded.

Figure 7:
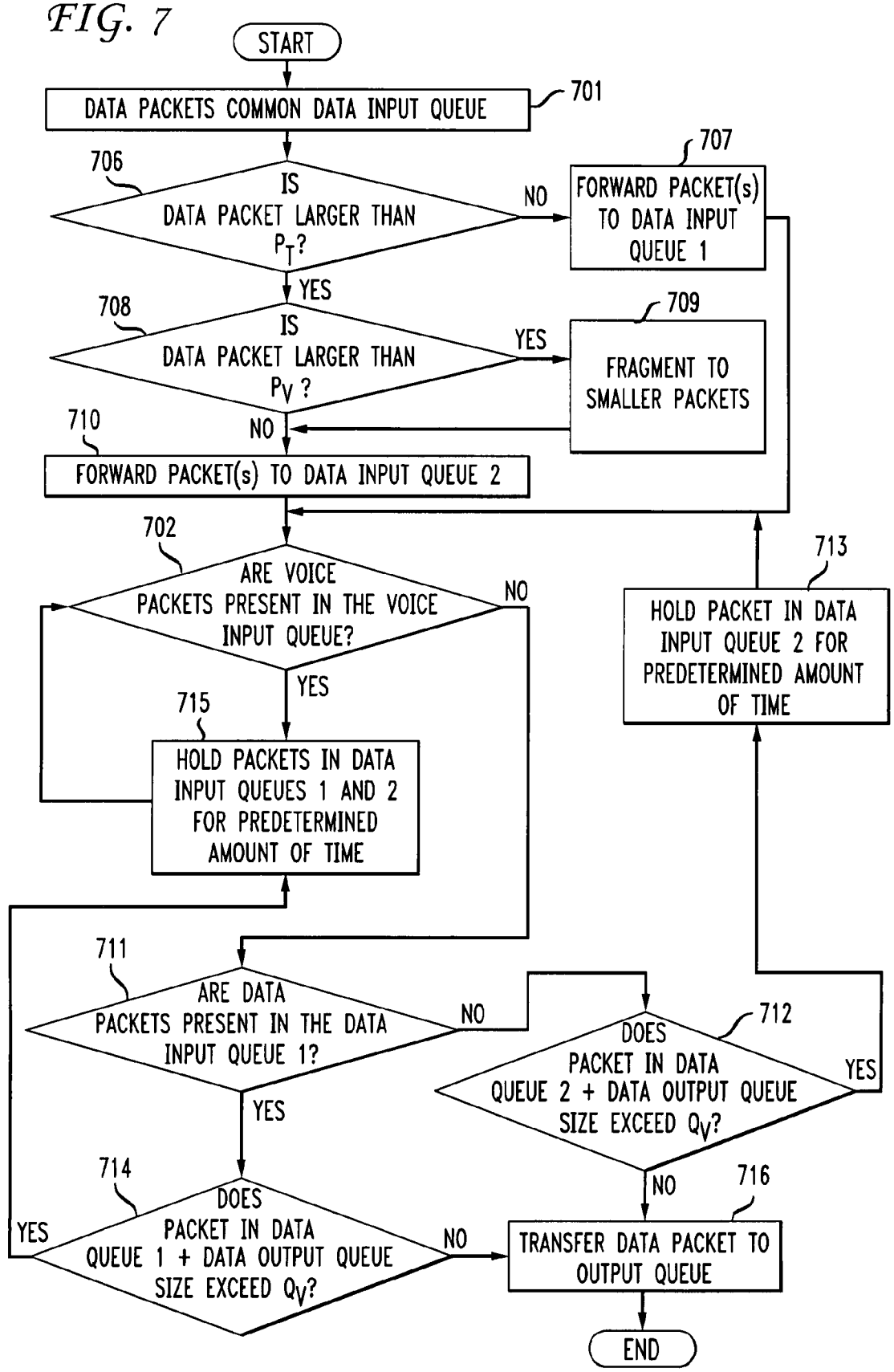
FIG. 7 shows a second embodiment of a method for use in the terminal adapter of FIG. 5 in accordance with the principles of the present invention.

FIG. 7 shows the steps of an illustrative method for processing data packets with the terminal adapter of FIG. 5 for transmission to the output queue when voice calls are present. It should be noted that any voice packets arriving at the voice input queue are illustratively immediately forwarded to the output queue without any restrictions. At step 701, a data packet enters the common data input queue 504 of a terminal adapter, such as terminal adapter 115 of FIG. 5. At step 706, a determination is made whether the incoming data packet is larger than a certain threshold $P_T$ (once again, illustratively 50 bytes). If the packet is smaller than or equal to this threshold, at step 707 the packet is forwarded to data input queue 1 508 in FIG. 5. If the packet is larger than $P_T$, a determination is made at step 708 whether or not the packet is also larger than the set value for the maximum packet size $P_V$ (illustratively 300 bytes). If the packet is smaller than $P_V$, then at step 710 the packet is forwarded directly to data input queue 2 507 in FIG. 5. Alternatively, if the packet is larger than $P_V$, then at step 709 the data packet is fragmented so that the resulting fragments are smaller than or equal to the size $P_V$. Then, at step 710 the fragmented packet(s) are sent to data input queue 2 507 in FIG. 5.

Whether the data packet is sent to data input queue 1 at step 707 or it is sent to data input queue 2 at step 710, a determination is next made at step 702 whether there is any voice packet in voice input queue 506 in FIG. 5. If there is a voice packet present, then the data packets are held in their respective input queues for a predetermined amount of time (illustratively, 1 ms) and another determination is made in step 702 whether voice packets are present. If there are no voice packets in voice input queue then in step 711 it is determined whether there are any data packets in data input queue 1. If there are data packets in data input queue 1, then at step 714 a determination is made whether the sum of the size of the packets in the output queue and the size of the incoming data packet in data input queue 1 exceeds the value of $Q_V$. If yes, then the packet is held in data input queue 1 for a predetermined amount of time (once again, 1 ms) and another determination is made in step 702 whether voice packets are present in the voice input queue. If the sum does not exceed $Q_V$ at step 714, then the data packet is forwarded from data input queue 1 to the output queue at step 716 and another determination is made once again at step 702 whether there are voice packets in the voice input queue. If in step 711 there are no further data packets in data input queue 1, then the determination is made at step 712 whether the sum of the size of the packets in the output queue and the size of the incoming data packet in data input queue 2 exceeds the value of $Q_V$. If yes then, once again, the packet is held in data input queue 2 for a predetermined time at step 713 and another determination is made again at step 702. If the sum is lower than $Q_V$ at step 712, the data packet in data input queue 2 is forwarded to output queue for further transmission at step 716. As discussed previously, one skilled in the art will recognize that, instead of making the admission decision on the occupancy of just the TA 115 of FIG. 1 output queue, one can make the admission decision on the occupancy of both the TA 115 of FIG. 1 and modem 111 of FIG. 1 output queues. In that case in steps 611 and 613 of FIG. 6 and in steps 712 and 714 of FIG. 7, the parameters $Q_{NV}$ and $Q_V$ could illustratively be applied to the sum of the sizes of packets in the TA 115 output queue and the modem 111 output queue.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Other arrangements will also be obvious to those skilled in the art. For example, as discussed above, while the principles of the present invention are discussed herein in association with the wired voice networks, the principles of the present invention can be used with any method of communication. Those skilled in the art could implement various other feature combinations without departing from the scope and spirit of the invention.

The invention claimed is:

1. A method for improved quality of service of voice and data calls in a packet network, said method comprising:
   receiving a first data packet in a first data input queue;
   forwarding said first data packet to one of a second and third data input queue based on a size of said first data packet;
   determining whether a voice packet is present in a voice input queue; and
   forwarding said first data packet to an output queue if said voice packet is not present in said voice input queue and if the sum of the size of said first data packet in said one of a second and third data input queue and the size of at least a second packet in said output queue would not exceed a size threshold established for said output queue, wherein said size threshold has a first value when at least one voice packet is present in said output queue and a second value when no voice packet is present in said output queue.

2. The method of claim 1 wherein said output queue is one or more queues upstream of said voice input queue and said first data input queue.

3. The method of claim 1 further comprising:
   prior to said step of forwarding said first data packet to one of a second and third data input queue, determining whether said first data packet exceeds a second size threshold established for said packet; and
   if said first data packet exceeds said second size threshold, fragmenting said first data packet into a plurality of smaller data packets.

4. The method of claim 3 wherein said second size threshold is a function of whether said voice packet is present in said voice input queue.

5. The method of claim 1 further comprising:
   holding said first data packet in said one of a second and third data input queue for a predetermined amount of time if a voice packet is present in said voice input queue.

6. The method of claim 1 further comprising:
   holding said first data packet in said one of a second and third data input queue for a predetermined amount of time if said sum of the size of said first data packet and the size of at least a second packet in said output queue exceeds said first size threshold.

7. A method for improved quality of service of voice and data calls in a packet network, said method comprising:
   receiving a first data packet in a first data input queue;
   forwarding said first data packet to one of a second and third data input queue based on a size of said first data packet;
   determining whether the sum of the size of said first data packet in said one of a second and third data input queue and the size of at least a second packet in an output queue exceeds a first size threshold established for said output queue; and
   forwarding said first data packet to said output queue if said first size threshold of said output queue is not exceeded, wherein said first size threshold has a first value when at least one voice packet is present in said output queue and a second value when no voice packet is present in said output queue.

8. The method of claim 7 wherein said output queue is one or more queues upstream of said first data input queue.

9. The method of claim 7 further comprising:
   prior to said step of forwarding said first data packet to one of a second and third data input queue, determining whether said first data packet exceeds a second size threshold established for said packet;
   fragmenting said first data packet into a plurality of smaller data packets if said first data packet exceeds said second size threshold.

10. The method of claim 7 further comprising:
    holding said first data packet in said one of a second and third data input queue for a predetermined amount of time if said sum of said first data packet and at least a second packet in said output queue exceeds a first size threshold established for said output queue.

11. The method of claim 7 wherein said step of forwarding said first data packet to one of a second and third data queue comprises:
    determining if the size of said first data packet exceeds a second size threshold associated with said first data packet;
    forwarding said first data packet to said second data input queue if said first data packet exceeds said second size threshold; and
    forwarding said first data packet to said third data input queue if said first data packet does not exceed said second size threshold.

12. Apparatus for improving the quality of service of voice and data calls in a packet network, said apparatus comprising:
    means for receiving a first data packet in a first data input queue;
    means for forwarding said first data packet to one of a second and third data input queue based on a size of said first data packet;
    means for determining whether a voice packet is present in a voice input queue; and
    means for forwarding said first data packet to an output queue if said voice packet is not present in said voice input queue and if the sum of the size of said first data packet in said first data input queue and the size of at least a second packet in said output queue would not exceed a size threshold established for said output queue, wherein said size threshold has a first value when at least one voice packet is present in said output queue and a second value when no voice packet is present in said output queue.

13. The apparatus of claim 12 wherein said output queue is one or more queues upstream of said voice input queue and said first data input queue.

14. The apparatus of claim 12 further comprising:
    means for determining whether said first data packet exceeds a second size threshold established for said packet; and
    means for fragmenting said first data packet into a plurality of smaller data packets if said first data packet exceeds said second size threshold.

15. The apparatus of claim 14 wherein said second size threshold is a function of whether said voice packet is present in said voice input queue.

16. The apparatus of claim 12 further comprising:
means for holding said first data packet in said one of a second and third data input queue for a predetermined amount of time if a voice packet is present in said voice input queue.

17. The apparatus of claim 12 further comprising:
means for holding said first data packet in said one of a second and third data input queue for a predetermined amount of time if said sum of the size of said first data packet and the size of at least a second packet in said output queue exceeds said first size threshold established for said output queue.

18. The apparatus of claim 12 wherein said first size threshold is a function of whether said voice packet is present in said voice input queue.

19. A terminal adapter for improved quality of service for voice and data calls in a packet network, said terminal adapter comprising:
a first data input queue;
a second data input queue;
a third data input queue;
a voice input queue;
an output queue; and
a first decision mechanism for determining whether to forward a data packet in said first data input queue to said second data input queue or said third data input queue based on a size of the data packet; and
a second decision mechanism for determining whether to forward a data packet in said second data input queue or said third data input queue to said output queue, wherein said second decision mechanism forwards the data packet to said output queue if the sum of the size of the data packet in said second data input queue or said third data input queue and the size of one or more packets in said output queue is below at least a first size threshold established for said output queue, said first size threshold having a first value when at least one voice packet is present in said output queue and a second value when no voice packet is present in said output queue, and
further wherein said decision mechanism holds said data packet in said second data input queue or said third data input queue for a predetermined amount of time if said sum exceeds said at least a first size threshold.

20. The terminal adapter of claim 19 wherein said output queue is one or more queues upstream of said voice input queue and said data input queue.

21. The terminal adapter of claim 19 wherein said first decision mechanism forwards a data packet to said second data input queue if the size of the data packet exceeds a second size threshold and forwards the data packet to said third data input queue if the size of the data packet does not exceed said second size threshold.

22. The terminal adapter of claim 21 wherein said second decision mechanism forwards data packets in said second data input queue only if there are no data packets in said third data input queue and there are no voice packets in said voice input queue.

23. The terminal adapter of claim 21 wherein said second decision mechanism forwards data packets in said third data input queue only if there are no voice packets in said voice input queue.

\* \* \* \* \*